US008563880B2

(12) United States Patent
Ogawa

(10) Patent No.: US 8,563,880 B2
(45) Date of Patent: Oct. 22, 2013

(54) OPERATING TOOL WITH CONDUCTOR PIECES

(75) Inventor: Yasuji Ogawa, Kurihashi-machi (JP)

(73) Assignee: Newcom, Inc., Ibaraki (JP)

( * ) Notice: Subject to any disclaimer, the term of this patent is extended or adjusted under 35 U.S.C. 154(b) by 533 days.

(21) Appl. No.: 12/439,115

(22) PCT Filed: Oct. 1, 2007

(86) PCT No.: PCT/JP2007/001067
§ 371 (c)(1),
(2), (4) Date: Feb. 26, 2009

(87) PCT Pub. No.: WO2008/050468
PCT Pub. Date: May 2, 2008

(65) Prior Publication Data
US 2010/0012396 A1    Jan. 21, 2010

(30) Foreign Application Priority Data
Oct. 24, 2006   (JP) ................. 2006-289118

(51) Int. Cl.
*G06K 11/06*   (2006.01)
*G06F 3/046*   (2006.01)
*G09B 5/00*    (2006.01)

(52) U.S. Cl.
USPC ................ 178/18.03; 178/18.01; 178/18.07; 434/317

(58) Field of Classification Search
USPC ................ 345/184, 156; 178/18.03
See application file for complete search history.

(56) References Cited

U.S. PATENT DOCUMENTS

| 3,021,711 | A |   | 2/1962  | Arvidson |
|-----------|---|---|---------|----------|
| 3,722,288 | A |   | 3/1973  | Weber |
| 3,819,857 | A |   | 6/1974  | Inokuchi |
| 4,353,050 | A |   | 10/1982 | Pelczyyk et al. |
| 4,529,959 | A | * | 7/1985  | Ito et al. ............ 338/295 |
| 4,658,373 | A |   | 4/1987  | Murakami et al. |
| 4,918,418 | A |   | 4/1990  | Tsala |
| 4,944,187 | A |   | 7/1990  | Frick |
| 4,951,036 | A | * | 8/1990  | Grueter et al. ........... 345/184 |
| 5,420,379 | A |   | 5/1995  | Zank et al. |
| 5,484,292 | A | * | 1/1996  | McTaggart ............ 434/317 |
| 5,543,588 | A |   | 8/1996  | Bisset et al. |
| 5,646,377 | A | * | 7/1997  | Oda ................ 178/18.07 |
| 5,861,583 | A |   | 1/1999  | Schediwy et al. |

(Continued)

FOREIGN PATENT DOCUMENTS

DE   102 52 862   7/2004
EP   1698874      6/2006

(Continued)

*Primary Examiner* — Vijay Shankar
*Assistant Examiner* — Amit Chatly
(74) *Attorney, Agent, or Firm* — Wells St. John P.S.

(57) ABSTRACT

An inexpensively-produced operating tool to which information about the direction of the operating tool or various kinds of identification information can be provided, and in which a switch can be provided. An operating tool (100), which is placed on the detection plane of a conductor detector capable of detecting a conductor by detecting a change in coupling coefficient of loop coil groups crossing each other, comprises a plurality of conductor pieces (102). The conductor piece has, for example, a circular shape, a rectangular shape, or a ring shape. At least a part of the plurality of conductor pieces may be arranged in a predetermined pattern such that the conductor detector can detect the direction of the operating tool.

21 Claims, 2 Drawing Sheets

(56) References Cited

U.S. PATENT DOCUMENTS

| | | | |
|---|---|---|---|
| 6,338,199 B1 | 1/2002 | Chigira et al. | |
| 6,370,965 B1 | 4/2002 | Knapp | |
| 6,471,613 B1 | 10/2002 | Botosan et al. | |
| 6,480,187 B1 | 11/2002 | Sano et al. | |
| 6,747,631 B1 | 6/2004 | Sakamaki et al. | |
| 6,803,906 B1 | 10/2004 | Morrison et al. | |
| 6,914,427 B2 | 7/2005 | Gifford et al. | |
| 7,343,813 B1 | 3/2008 | Harrington | |
| 7,381,128 B2 | 6/2008 | Ogawa et al. | |
| 7,692,625 B2 | 4/2010 | Morrison et al. | |
| 7,703,342 B2 | 4/2010 | Ogawa | |
| 7,800,362 B1 | 9/2010 | Ogawa | |
| 2001/0019325 A1 | 9/2001 | Takekawa | |
| 2002/0075243 A1 | 6/2002 | Newton | |
| 2002/0145595 A1 | 10/2002 | Satoh | |
| 2002/0179339 A1* | 12/2002 | Ely et al. | 178/18.07 |
| 2003/0141867 A1 | 7/2003 | Inoue | |
| 2004/0201575 A1 | 10/2004 | Morrison | |
| 2007/0089915 A1 | 4/2007 | Ogawa | |
| 2007/0146958 A1 | 6/2007 | Babcock et al. | |
| 2007/0214897 A1 | 9/2007 | Ogawa | |

FOREIGN PATENT DOCUMENTS

| | | | | |
|---|---|---|---|---|
| EP | 1873507 | | 1/2008 | |
| JP | 51-46714 | | 12/1976 | |
| JP | 52-45823 | | 4/1977 | |
| JP | 57-100331 | | 6/1982 | |
| JP | 57-165849 | | 11/1982 | |
| JP | 61-135240 | | 8/1986 | |
| JP | 62-31865 | | 8/1987 | |
| JP | 62-226030 | | 10/1987 | |
| JP | 1-212301 | A | 8/1989 | |
| JP | 2-78925 | A | 3/1990 | |
| JP | 6-10269 | Y2 | 3/1994 | |
| JP | 6-46171 | B2 | 6/1994 | |
| JP | 7-55615 | A | 3/1995 | |
| JP | 9-113203 | | 10/1995 | |
| JP | 09-113203 | | 5/1997 | |
| JP | 10-198494 | | 7/1998 | |
| JP | 2000-322201 | A | 11/2000 | |
| JP | 2001-265517 | A | 9/2001 | |
| JP | 2002-268807 | | 9/2002 | |
| JP | 2002-301264 | | 10/2002 | |
| JP | 2003-0294547 | | 10/2003 | |
| JP | 2003-337071 | | 11/2003 | |
| JP | 2005-096580 | | 4/2005 | |
| JP | 2005-156474 | | 6/2005 | |
| JP | 2005-275760 | | 10/2005 | |
| JP | 2005275760 A | * | 10/2005 | G06F 3/03 |
| JP | 3928976 | | 6/2007 | |
| WO | WO 02/03316 A1 | | 1/2002 | |
| WO | WO 2004/104810 | | 2/2004 | |
| WO | PCT/JP2004/005961 | | 6/2004 | |
| WO | PCT/JP2004/016390 | | 1/2005 | |
| WO | WO 2005/052532 | | 6/2005 | |
| WO | PCT/JP2006/306432 | | 6/2006 | |
| WO | WO 2006/106714 | | 10/2006 | |
| WO | WO 2007/148429 A1 | | 12/2007 | |
| WO | WO 2008/007458 A | | 1/2008 | |

\* cited by examiner

OPERATING TOOL WITH CONDUCTOR PIECES

CROSS REFERENCE TO RELATED APPLICATION

This is a 35 U.S.C. §371 application of and claims priority to International Application No. PCT/JP2007/001067, which was filed on Oct. 1, 2007, and which claims priority to Japanese Patent Application No. 2006-289118, which was filed on Oct. 24, 2006, and the teachings of all the applications are incorporated by reference.

TECHNICAL FIELD

The present invention relates to an operating tool for operating a computer or a game device, and more particularly to an operating tool with conductor pieces which is used in combination with a conductor detector capable of detecting the position of the conductor pieces placed on a detection plane of the conductor detector to operate a computer or a game device.

BACKGROUND ART

As a typical operating tool for operating a computer or a game device, a keyboard, a mouse, and the like are known. Further, there also exists a card-type operating tool on which an optical pattern such as a barcode is printed (Patent Document 1). Further, as an operating tool for input/output operation of information from/to an information reading apparatus, a magnetic card or an IC card in which a semiconductor integrated circuit is embedded, and the like are known.

Further, there is known a data tablet using a conductor as a position indicator or a data tablet using a coil that can be opened or closed by a switch (Patent Document 2).

Patent Document 1: Japanese Patent Application Kokai Publication No. 2002-301264
Patent Document 2: Japanese Patent Application Kokai Publication No. 10-198494

DISCLOSURE OF THE INVENTION

Problems to be Solved by the Invention

However, in the case of the operating tool as disclosed in Patent Document 1 on which an optical pattern is printed, a camera unit is used as a pattern reading section, so that the thickness of the reading plane is increased, resulting in an increase in not only the size of the apparatus but also the cost. This made it difficult to apply this technique to an operating tool for a home game device. Further, in the case of the magnetic card or IC card, it was difficult to manufacture the operating tool itself at low cost due to use of expensive magnetic tape or IC to be embedded.

Further, the technique disclosed in Patent Document 2 can only detect the position coordinate of a conductor, but cannot detect the direction or the identification information of the position indicator. Further, in the case of the indicator using a coil that can be opened/closed by a switch, the indication position can be detected only when the switch is closed, so that it was impossible to emulate mouse behavior.

The present invention has been made in view of the above situation, and an object thereof is to provide an operating tool capable of being manufactured at low cost, including not only information representing the direction of the operating tool but also various identification information of the operating tool, and including a switch.

Means for Solving the Problems

To attain the above object, according to the present invention, there is provided an operating tool placed on a detection plane of a conductor detector that can detect a conductor by detecting a change in coupling coefficient between loop coil groups crossing each other, the operating tool comprising a plurality of conductor pieces that can be detected by the conductor detector.

At least one of the plurality of conductor pieces may have a circular shape, a rectangular shape, or a ring shape.

At least one of the plurality of conductor pieces may be a loop coil having switch for opening/closing the loop of the loop coil.

At least three of the plurality of conductor pieces may be arranged in a pattern that allows the conductor detector to detect the direction of the operating tool.

At least one of the plurality of conductor pieces may have a shape that allows the conductor detector to detect the direction of the operating tool.

At least some of the plurality of conductor pieces may be arranged in a predetermined pattern that allows the operating tool to have identification information.

The operating tool may further have a rotating member which is rotated about an axis perpendicular to the detection plane, and at least one of the plurality of conductor pieces may be arranged on the rotating member.

The operating tool may have a card shape, and the plurality of conductor pieces may each be made of a thin film.

The plurality of conductor pieces may each have a width equal to or slightly larger than the width of each of the loop coils of the conductor detector.

Advantages of the Invention

The present invention has an advantage that not only information representing the direction of the operating tool but also various identification information can be provided to the operating tool at very low cost. Further, by providing a switch, it is possible to realize an input device like a mouse. Further, since the detection plane of the conductor detector can be formed into a thin sheet, the conductor detector can be applied to a home game device and the like at low cost.

BEST MODE FOR CARRYING OUT THE INVENTION

A preferred embodiment according to the present invention will be described with reference to the accompanying drawings. FIG. 1 is a schematic view explaining a configuration of a conductor detector used for detecting an operating tool of the present invention. As shown in FIG. 1, the conductor detector includes a detection plane 1 constituted by loop coil groups 2 and 3 crossing each other, a drive section 10, and a detection section 20. The drive section 10 and the detection section 20 are connected to the loop coil groups 2 and 3 through a drive coil switch 30 and a detection coil switch 40. When an operating tool 100 of the present invention is placed on the detection plane 1, the conductor detector detects a conductor piece 102 arranged in the operating tool 100.

The crossing loop coil groups are constituted by a drive loop coil group 2 and a detection loop coil group 3 which are stacked in such a manner as to cross each other. In the example of FIG. 1, the loop coils are arranged such that they partly overlap one another so as to increase resolution. However, the configuration of the crossing loop coils 2 and 3 is not limited to that shown in FIG. 1 but may be of any suitable construction as long as the intersections of the loop coil groups 2 and 3 are electromagnetically coupled to each other. For example, the drive loop coil groups 2 and the detection coil groups 3 may be arranged in a non-overlapped manner but in parallel to each other on the same plane. The operating tool of the present invention can be detected using by a detector constituted by such crossing loop coil groups and having a thin detection plane capable of detecting a change in coupling coefficient.

The drive section 10 drives the drive loop coil group 2. More specifically, the drive section 10 is mainly constituted by a high frequency oscillator 11 and a drive amplifier 12. Through the drive coil switch 30, the drive section 10 is sequentially connected to respective drive loop coils to sequentially drive the same. A configuration may be adopted in which all the drive loop coils are driven at a time by changing the drive frequency for each drive loop coil.

The detection section 20 detects, from the detection loop coil group 3, a change in coupling coefficient (change in the degree of electromagnetic coupling) between the drive loop coil and the detection loop coil. More specifically, the detection section 20 is mainly constituted by a detection amplifier 21 and a synchronization detection section 22. Through the detection coil switch 40, the detection section 20 is sequentially connected to respective detection loop coils to sequentially detect an induced current or induced voltage from the detection loop coils. The synchronization detection section 22 is also connected to an output of the oscillator 11, calculates a product of the output from the oscillator 11 and the output of the detection loop coil, and integrates the product with respect to time. A configuration may be adopted in which changes in the coupling coefficient are detected from all the detection loop coils by individually providing a detection circuit for each detection loop coil or by utilizing a frequency filter circuit or the like.

The operating tool of the present invention is detected using the conductor detector having such a configuration. That is, the intersections are arranged in a matrix form. It follows that changes in the coupling coefficient on x-y coordinates on the intersections can be obtained, whereby conductor pieces arranged in the operating tool can be detected. The configuration of the conductor detector for detecting the operating tool of the present invention is not limited to that shown in FIG. 1 but may be of any suitable construction as long as a change in the coupling coefficient can be detected on a plurality of positions. For example, the detection plane may be formed by simply crossing coil groups each including loop coils arranged in parallel or may be formed as disclosed in Japanese Patent Application No. 2006-169145 of the present inventor. That is, the intersections of the loop coil groups may be coupled directly or may be coupled indirectly through the conductor pieces of the operating tool to be placed.

An example of the operating tool according to the present invention is shown in FIG. 2. FIG. 2 is a top view for explaining an example of the operating tool which is formed into a card shape. As shown in FIG. 2, an operating tool 100 of the present invention includes a plurality of conductor pieces 102 arranged on or in a base plate 101. The base plate 101 has a card shape to form the card-shaped operating tool in the example of FIG. 2. However, the present invention is not limited to this, but the operating tool may have any shape as long as the conductor pieces are arranged in the vicinity of the detection plane so that they are detected by the conductor detector. Examples of a material of the base plate 101 include plastic, PET, paper or the like. However, the material of the base plate 101 is not limited to the above, but may be any material that exhibits nonconductive and nonmagnetic characteristics.

Further, the conductor piece 102 may be any type as long as it has conductivity and is configured to be detected by the conductor detector. For example, it is possible to obtain the conductor piece 102 at low cost by attaching a thin film such as aluminum to the base plate 101. Alternatively, it is possible to obtain a conductor piece pattern by printing conductive ink onto the base plate 101. The conductor piece 102 has a circular shape in the example of FIG. 2. However, the present invention is not limited to this, but the conductor piece 102 may be formed into any other shape, such as rectangular shape or ring shape. The shapes of the plurality of conductor pieces to be arranged need not be the same as one another, but they may be formed into various different shapes depending on the usage of the shape pattern to be detected by the conductor detector. For example, a configuration may be adopted in which the conductor detector can identify the operating tool depending on a difference in the number or the arrangement of conductor pieces on the operating tool. Although the identification may be achieved by changing the size of the conductor pieces, it is preferable that the sizes of the conductor pieces arranged on the operating tool are equal to one another in terms of detection accuracy of the conductor detector or pitch width of the loop coil groups.

Since the conductor detector does not detect the conductor piece of unknown size but detects the conductor piece of a predetermined size, the width (diameter or length of a side) of the conductor piece can previously be set to an optimum size for the conductor detector. That is, in the case where the conductor detector is configured not to detect the shape of the conductor pieces of the operating tool but to detect presence/absence of the conductor pieces or the arrangement of the conductor pieces, the conductor piece preferably has a width equal to or slightly larger than the width of each of the loop coil group of the conductor detector. This configuration can increase the sensitivity of detecting the conductor pieces. The conductor detector is configured to detect a change in the electromagnetic coupling due to influence of eddy current generated in each conductor piece at the intersections of the loop coils, so that when the width of the conductor piece is set to a value at which the eddy current is easily generated, detection reliability of the conductor detector can be improved.

In the case where the shape of the conductor piece needs to be identified, for example, in the case where the circular shaped conductor piece and the ring shaped conductor piece need to be detected in distinction from each other, the coil width or pitch of the loop coil group is made denser relative to the conductor piece so that the conductor piece can be detected with high resolution.

The conductor pieces on the operating tool of the present invention need not be regularly arranged as shown in FIG. 2 but may be arranged in various patterns depending on the usage of the pattern detected by the conductor detector. For example, in the case of the operating tool 100 shown in FIG. 2, only some of the conductor pieces (in this case, conductor pieces 102a to 102c) are arranged in fixed positions so as to detect the direction of the operating tool, and the remaining conductor pieces are arranged in a regular pattern so that the operating tool can be identified based on the presence/absence of the conductor pieces at predetermined positions b0 to b7. In the example shown in FIG. 2, the conductor pieces 102a to 102c which are fixed at three positions are arranged in a pattern that allows the conductor detector to detect the direction of the operating tool 100. In the case where the direction of the operating tool is made detectable, not only a configuration in which the three conductor pieces are arranged at fixed positions in an asymmetrical manner but also various arrangement patterns may be applied as long as they are arranged in a specific pattern that allows the conductor detector to detect the direction of the operating tool. For example, the conductor pieces may be arranged in an L-shape or T-shape. Further, the conductor pieces may be arranged in an I-shaped with intervals between them made different. As described above, by using at least three conductor pieces, it is possible to detect the direction of the operating tool. In the case where a card-shaped operating tool is used, when the conductor pieces fixed for detecting the direction of the operating tool are arranged in an asymmetrical manner, the side (front or back side) of the card placed on the conductor detector can be identified.

In the operating tool 100 shown in FIG. 2, when the conductor pieces are arbitrarily arranged on the predetermined positions b0 to b7, it is possible to provide specific identification information to the operating tool. That is, 8-bit coded identification information can be provided based on the presence/absence of the conductor pieces at the predetermined positions b0 to b7. Thus, bit information of "0" indicating the absence of the conductor piece and "1" indicating the presence of the conductor piece can be notified to the conductor detector. In the case of the example shown in FIG. 2, the conductor piece is arranged only at b0, so that coded identification information is "10000000". The arrangement pattern of the conductor pieces is not limited to that shown in FIG. 2 but may be variously modified as long as the conductor pieces are arranged in a predetermined pattern. For example, the conductor pieces may be arranged in a row. Further, the number of the conductor pieces to be used is not limited to 8 (i.e., 8-bit coded information) but may be appropriately determined according to the usage.

The above arrangement for providing the identification information can be identified by providing the conductor pieces 102*a* to 102*c* used for detecting the direction of the operating tool. However, when the arrangement itself of the conductor pieces for providing the identification information is made to be detectable of the direction of the operating tool, the need to additionally provide the conductor pieces only for the direction detection is eliminated. Specifically, a configuration can be considered in which some bits of the conductor pieces used for providing the identification information are fixedly used for the direction detection.

Another configuration of the conductor pieces provided on the operating tool of the present invention will be described with reference to FIG. 3. FIG. 3 is a top view for explaining an example of the operating tool in which some of the conductor pieces are constituted by loop coils each having a switch for opening/closing the loop. In FIG. 3, the same reference numerals as those in FIG. 2 denote the same parts as those in FIG. 2, and the overlapped description is omitted. On an operating tool 110 of FIG. 3, a loop coil 103 is provided. The loop coil 103 has a switch 103*a* for opening/closing the loop of the loop coil 103. In the case where the switch 103*a* is in an OFF state, i.e., the loop of the loop coil 103 is opened, the loop coil 103 is not detected by the conductor detector, while in the case where the switch 103*a* is in an ON state, i.e., the loop of the loop coil 103 is strung, the loop coil 103 is detected by the conductor detector. By using this configuration, it is possible to transmit dynamic information by ON/OFF operation of the switch. In the case where the line width of the loop coil 103 is large relative to the pitch width of the loop coil group of the conductor detector, the shape of the loop coil 103 is detected by the conductor detector irrespective of ON/OFF state of the switch 103*a*, so that the line width of the loop coil 103 is preferably smaller than the pitch width of the loop coil 103.

For example, as shown in FIG. 3, by using two loop coils 103 each having the switch 103*a*, it is possible to realize an operating tool like a mouse used in a computer. The operating tool of the present invention has the plurality of conductor pieces. Thus, even if all the switches 103*a* are in an OFF state, other conductor pieces, e.g., conductor pieces 102*a* to 102*c* are detected, so that the position of the operating tool 100 can be detected. The direction of the operating tool can also be detected by using the conductor pieces 102*a* to 102*c*, so that even if there exist a plurality of loop coils each having the switch, it is possible to easily detect, e.g., which loop coil is in an ON state. Therefore, operation like a right click or left click of the mouse can be realized.

In the case where the operating tool is used for a game device, the switch can be allocated to, e.g., a missile fire button. Since it is possible to provide switches in the operating tool, as well as to provide the identification information to the operating tool, a configuration in which, e.g., the type of a weapon can be changed by changing the card (i.e., operating tool) can be realized at low cost. Specifically, in the operating tool 100 of FIG. 3, the conductor pieces 102 are arranged at b3 and b4. In this configuration, when both the switches of the loop coils 103 are in an OFF state, code information represented by the b0 to b7 is "00011000". When one or both of the switches are turned ON, the coded information is changed to "00011010", "00011001", or "00011011". By inputting such coded information to the game device, the type of a weapon can be specified or ON/OFF of the missile fire button can be operated. As described above, by using the operating tool of the present invention, it is possible to perform input of a predetermined character, point, item or the like, or specification of operation for an object on a screen based on the coded information including identification information and switch state. Although the loop coils 103 are arranged at the positions of bits b6 and b7 in the example of FIG. 3, the present invention is not limited to this, but the loop coil with switch may be arranged at a position that is irrelevant to the identification information.

As described above, information detected by the conductor detector is input to a computer or a game device to cause a predetermined operation. Since there can be virtually an infinite number of bit information or pattern information, the operation tool of the present invention can be used as, e.g., a merchandise management tag. In this case, coded information such as article number or production number can be represented by the arrangement pattern of the conductor pieces. Further, when conductive ink is printed on, e.g., a paper as the conductor pieces, it is possible to manufacture a tag at lower cost as compared to a tag containing an IC chip such as an RFID. At this time, the conductor piece is constituted by a loop coil and a cut portion is provided to the loop coil as a switch. Then, for example, an inspection code can be generated by cutting the loop coil. Further, it is possible to constitute the identification information by marking a predetermined position of the operating tool with a conductive ink pen or the like.

Still another configuration of the conductor pieces provided on the operating tool of the present invention will be described with reference to FIG. 4. FIG. 4 is a top view for explaining an example of the card shaped operating tool in which a plurality of conductor pieces are arranged on a rotating member. In FIG. 4, the same reference numerals as those in FIG. 1 or FIG. 2 denote the same parts as those in FIG. 1 or FIG. 2, and the overlapped description is omitted. A rotating member 121 is provided on an operating tool 120 shown in FIG. 3. The rotating member 121 is configured to be rotated about an axis perpendicular to the conductor detector. In the example of FIG. 4, a disk shaped rotating member 121 is provided on the card shaped base plate 101 in parallel thereto. On the rotating member 121, a plurality of conductor pieces 104 are provided. When at least three conductor pieces are provided on the rotating member 121, the rotation direction of the rotating member 121 can be detected. Although the conductor piece 104 has a ring shape in the example of FIG. 4, the present invention is not limited to this. For example, the conductor pieces 104 may have a circular shape, a rectangular shape, or any other shape. In this example, the rotating member 121 is rotated to cause the positions of the conductor pieces to be rotationally moved. Therefore, the conductor piece itself preferably has a non-directional shape such as a circular shape or ring shape. The conductor detector can detect the movement of the conductor pieces on the detection plane in real time, so that when an operating tool having such a rotating mechanism is used, a volume control function and the like can be realized.

If necessary, conductor pieces 122 constituting a pattern for detecting the direction of the operation tool may be arranged on the base plate 101 at a portion other than the rotating member 121. With this configuration, it is possible to distinguish between the movement of the conductor pieces caused by the rotation of the rotating member and the movement of the conductor pieces caused by the movement of the base plate. When the total number of the conductor pieces for direction detection and those arranged on the rotating member is three or more, the direction of the operating tool and the rotation direction of the rotating member can be detected based on the positional relationship between the conductor pieces. Further, if necessary, the identification information described with reference to FIG. 2 may be provided to the operating tool.

The operating tool of the present invention is not limited to the above examples, but various modifications may be made without departing from the scope of the technical idea of the present invention. For example, a configuration may be adopted in which the above examples are combined to provide a loop shaped conductor piece having a switch on the operating tool having a rotating mechanism. Further, the conductor detector is not limited to the above examples but may be of suitable construction as long as it can detect the positions of a plurality of conductors.

EXPLANATION OF REFERENCE SYMBOLS

Figure 1:
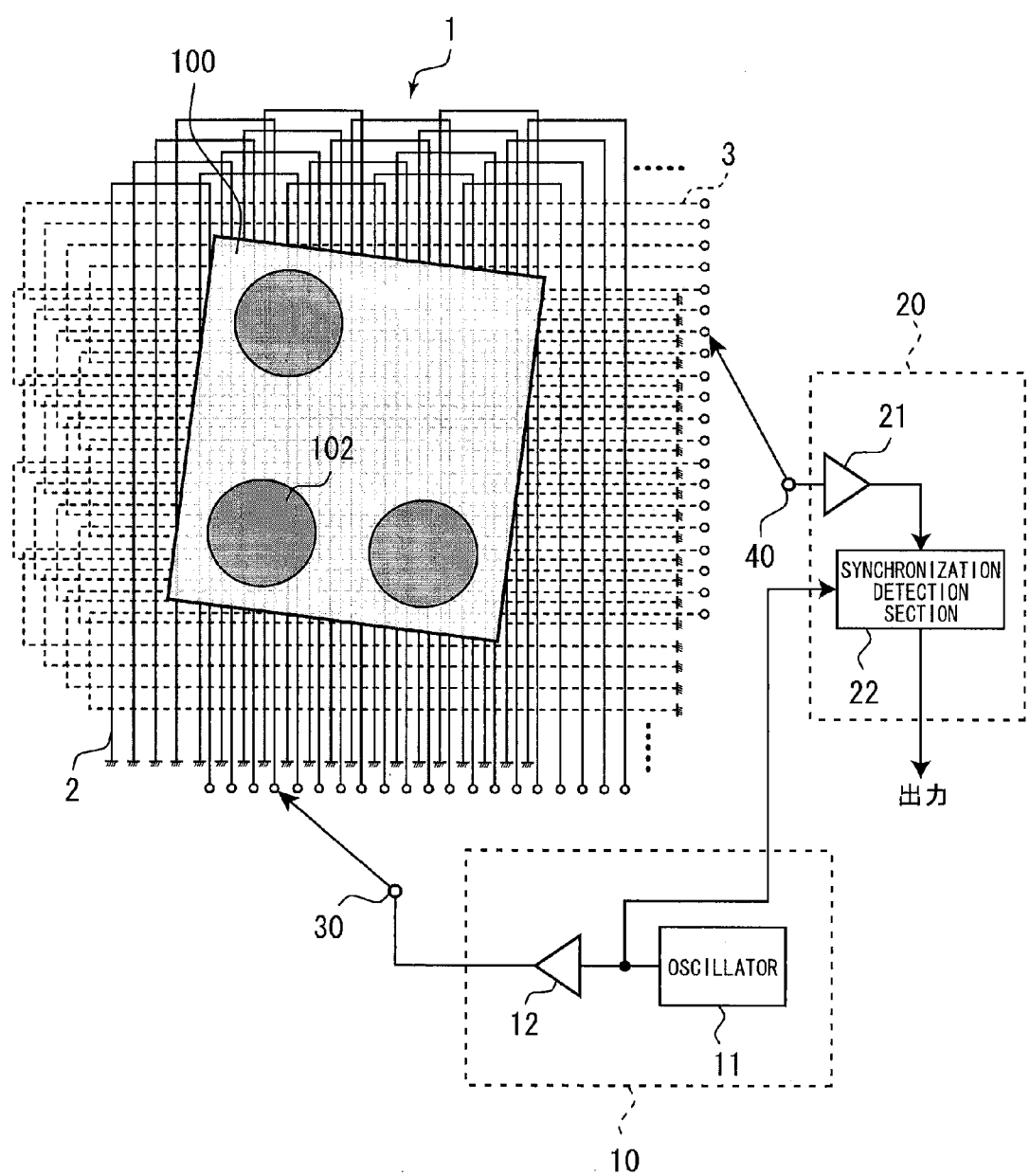
FIG. 1 is a schematic view explaining a configuration of a conductor detector used for detecting an operating tool of the present invention.
Figure 2:
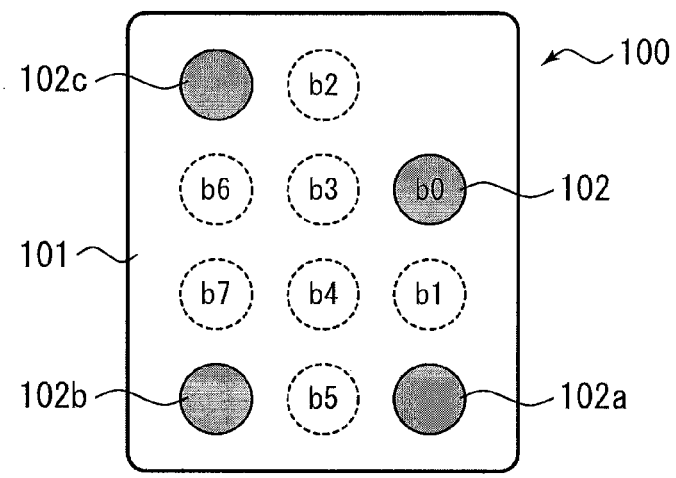
FIG. 2 is a top view for explaining an example of the operating tool of the present invention which is formed into a card shape.
Figure 3:
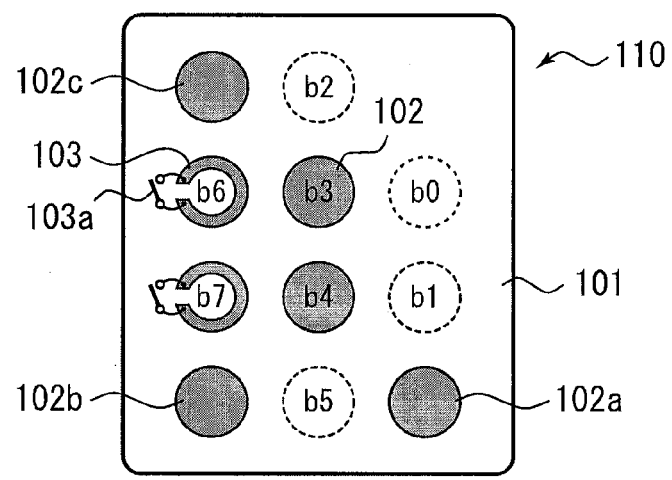
FIG. 3 is a top view for explaining an example of the operating tool of the present invention in which some of the conductor pieces are constituted by loop coils each having a switch for opening/closing the loop.
Figure 4:
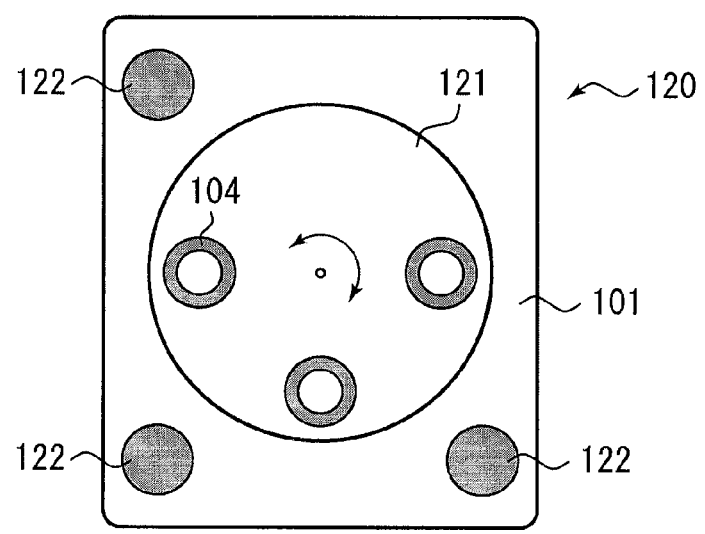
FIG. 4 is a top view for explaining an example of the operating tool of the present invention in which a plurality of conductor pieces are arranged on a rotating member.

1: Detection plane
2: Drive loop coil group
3: Detection loop coil group
10: Drive section
11: Oscillator
12: Drive amplifier
20: Detection section
21: Detection amplifier
22: Synchronization detection section
30: Drive coil switch
40: Detection coil switch
100, 110, 120: Operating tool
101: Base plate
102, 104, 122: Conductor piece
103: Loop coil
103a: Switch
121: Rotating member

What is claimed is:

1. An operating tool placed on a detection plane of a conductor detector that can detect a conductor by detecting a change in coupling coefficient between loop coil groups crossing each other, said operating tool comprising a plurality of conductor pieces that can be detected by the conductor detector, at least some of the plurality of conductor pieces being arranged in a predetermined pattern that allows the operating tool to have coded identification information provided based on presence/absence of the conductor pieces at predetermined positions.

2. The operating tool according to claim 1, in which at least one of the plurality of conductor pieces has a rectangular shape.

3. The operating tool according to claim 1 in which at least one of the plurality of conductor pieces is a loop coil having switch for opening/closing the loop of the loop coil.

4. The operating tool according to claim 1, in which at least three of the plurality of conductor pieces are arranged in a pattern that allows the conductor detector to detect the direction of the operating tool.

5. The operating tool according to claim 1, in which at least one of the plurality of conductor pieces has a shape that allows the conductor detector to detect the direction of the operating tool.

6. The operating tool according to claim 1, which further comprises a rotating member which is rotated about an axis perpendicular to the detection plane, wherein at least one of the plurality of conductor pieces is arranged on the rotating member.

7. The operating tool according to claim 1, in which the operating tool has a card shape, and the plurality of conductor pieces are each made of a thin film.

8. The operating tool according to claim 1, in which the plurality of conductor pieces each have a width equal to or slightly larger than the width of each of the loop coil group of the conductor detector.

9. The operating tool according to claim 1, in which at least one of the plurality of the conductor pieces has a rectangular shape or a ring shape.

10. The operating tool according to claim 1 wherein the predetermined pattern of the plurality of the conductor pieces comprises a regular pattern.

11. The operating tool according to claim 1 wherein the predetermined pattern of the plurality of the conductor pieces comprises an asymmetric pattern.

12. The operating tool according to claim 1 wherein the predetermined pattern of the plurality of the conductor pieces comprises an L-shaped pattern, a T-shaped pattern or an I-shaped pattern.

13. The operating tool according to claim 1 wherein the plurality of the conductor pieces comprises conductive ink.

14. The operating tool according to claim 1 wherein the conductor pieces comprise a physical structure other than a coil structure.

15. The operating tool according to claim 1 wherein the conductor detector is configured to detect a change in the electromagnetic coupling due to influence of an eddy current generated in each conductor piece at the intersection of the loop coils.

16. The operating tool according to claim 1 wherein at least one of the plurality of conductor pieces comprises an arc configuration having two terminal ends facing and spaced from each other, the two terminal ends coupled to a switch for opening/closing the arc configuration.

17. The operating tool according to claim 1 further comprising a rotating member which is rotated about an axis perpendicular to the detection plane, at least one of the plurality of conductor pieces is arranged on the rotating member, and wherein the entire structure for the rotating member comprises a disk structure and an axial structure.

18. An operating tool placed on a detection plane of a conductor detector that can detect a conductor by detecting a change in coupling coefficient between loop coil groups crossing each other, said operating tool comprising:
    a plurality of conductor pieces that can be detected by the conductor detector, at least some of the plurality of conductor pieces being arranged in a predetermined pattern that allows the operating tool to have identification information; and
    wherein at least one of the plurality of conductor pieces is a loop coil having a switch for opening/closing the loop of the loop coil.

19. An operating tool placed on a detection plane of a conductor detector that can detect a conductor by detecting a change in coupling coefficient between loop coil groups crossing each other, said operating tool comprising:
    a plurality of conductor pieces that can be detected by the conductor detector, at least some of the plurality of conductor pieces being arranged in a predetermined pattern that allows the operating tool to have identification information; and
    a rotating member which is rotated about an axis perpendicular to the detection plane, wherein at least one of the plurality of conductor pieces is arranged on the rotating member.

20. An operating tool placed on a detection plane of a conductor detector that can detect a conductor by detecting a change in coupling coefficient between loop coil groups crossing each other, said operating tool comprising:
    a plurality of conductor pieces that can be detected by the conductor detector, at least some of the plurality of conductor pieces being arranged in a predetermined pattern that allows the operating tool to have identification information; and
    wherein at least one of the plurality of conductor pieces comprises an arc configuration having two terminal ends facing and spaced from each other, the two terminal ends coupled to a switch for opening/closing the arc configuration.

21. An operating tool placed on a detection plane of a conductor detector that can detect a conductor by detecting a change in coupling coefficient between loop coil groups crossing each other, said operating tool comprising:
    a plurality of conductor pieces that can be detected by the conductor detector, at least some of the plurality of conductor pieces being arranged in a predetermined pattern that allows the operating tool to have identification information; and
    a rotating member which is rotated about an axis perpendicular to the detection plane, at least one of the plurality of conductor pieces is arranged on the rotating member, and wherein the entire structure for the rotating member comprises a disk structure and an axial structure.

* * * * *